(12) United States Patent
Kang

(10) Patent No.: US 9,166,676 B2
(45) Date of Patent: Oct. 20, 2015

(54) TELEMATICS COMMUNICATION SYSTEM AND METHOD

(71) Applicant: Hyundai Mobis Co., Ltd., Seoul (KR)

(72) Inventor: Tae Wook Kang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 60 days.

(21) Appl. No.: 13/901,256

(22) Filed: May 23, 2013

(65) Prior Publication Data

US 2013/0322310 A1    Dec. 5, 2013

(30) Foreign Application Priority Data

May 24, 2012    (KR) .......................... 10-2012-0055468

(51) Int. Cl.
*H04W 4/00* (2009.01)
*H04B 7/26* (2006.01)

(52) U.S. Cl.
CPC ...................................... *H04B 7/26* (2013.01)

(58) Field of Classification Search
None
See application file for complete search history.

(56) References Cited

U.S. PATENT DOCUMENTS

| | | | |
|---|---|---|---|
| 7,643,463 B1* | 1/2010 | Linsky et al. | 370/344 |
| 2005/0078672 A1* | 4/2005 | Caliskan et al. | 370/389 |
| 2008/0227488 A1* | 9/2008 | Zhu et al. | 455/553.1 |
| 2010/0131642 A1* | 5/2010 | Chalikouras et al. | 709/224 |
| 2010/0322287 A1* | 12/2010 | Truong et al. | 375/133 |
| 2010/0330918 A1* | 12/2010 | Taghavi Nasrabadi et al. | 455/63.3 |
| 2012/0309341 A1* | 12/2012 | Ward | 455/404.2 |
| 2013/0303214 A1* | 11/2013 | Ahmadi | 455/501 |
| 2014/0120969 A1* | 5/2014 | Sang et al. | 455/501 |
| 2014/0140381 A1* | 5/2014 | Sang et al. | 375/219 |

FOREIGN PATENT DOCUMENTS

| | | | |
|---|---|---|---|
| JP | 2002-300172 A | 10/2002 | |
| KR | 2002-0086987 A | 11/2002 | |
| KR | 10-2009-0060050 A | 6/2009 | |
| KR | 10-2011-0126947 A | 11/2011 | |

* cited by examiner

*Primary Examiner* — Anh-Vu Ly
(74) *Attorney, Agent, or Firm* — NSIP Law

(57) ABSTRACT

A communication system included in a telematics unit is provided. A GPIO communication port connects a plurality of communication modules included in the telematics unit, and thus enables each of the communication modules to transmit/receive data depending on the data transmission/reception state of the other communication module. Accordingly, provided are a telematics communication system and method that prevents a data transmission/reception speed from being reduced due to frequency interference between the plurality of communication modules.

12 Claims, 4 Drawing Sheets

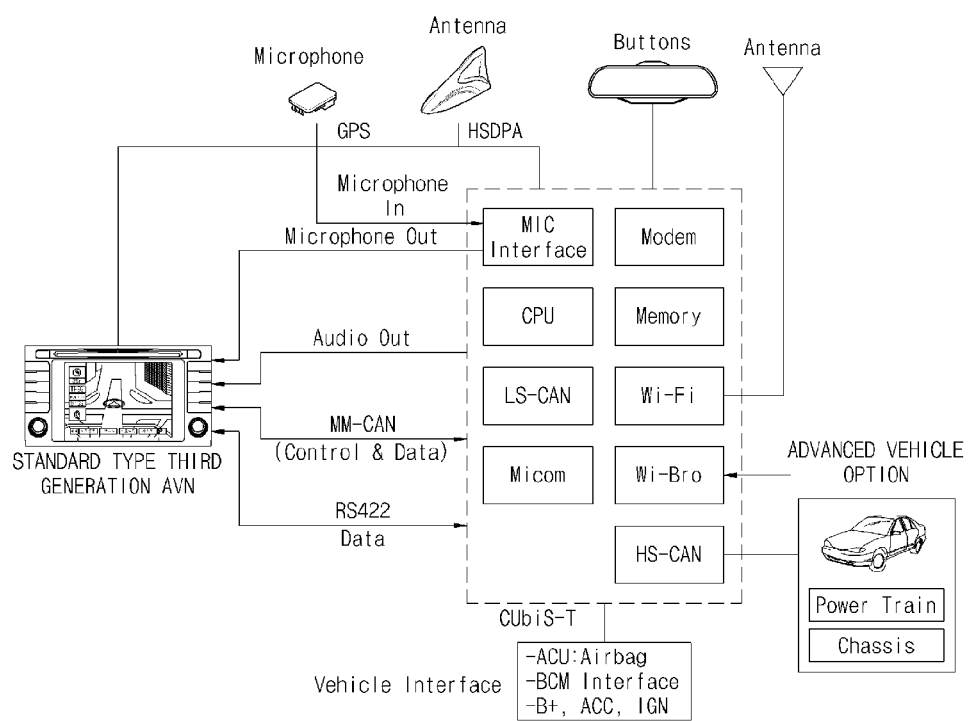

TELEMATICS COMMUNICATION SYSTEM AND METHOD

CROSS-REFERENCE TO RELATED APPLICATIONS

This application claims priority under 35 U.S.C. §119 to Korean Patent Application No. 10-2012-0055468, filed on May 24, 2012, the disclosure of which is incorporated herein by reference in its entirety.

TECHNICAL FIELD

The present disclosure relates to a communication system that enables a telematics unit of a vehicle to wirelessly communicate with a wireless network inside or a mobile communication network outside the vehicle, and in particular, to a communication system and method that prevent, when a plurality of communication modules are included in the telematics unit, frequency interference between the communication modules by using a communication port connected between the communication modules, and thus prevent the data transmission/reception speed of each of the communication modules from being reduced.

BACKGROUND

Recently, much development is being done on service and solutions that operationally connect a mobile communication network outside and a wireless network inside a vehicle by using telematics and thus provide an office environment into the vehicle.

FIG. 1 is a diagram illustrating a telematics unit, which provides the service and solutions, and apparatuses operationally connected to the telematics unit. The telematics unit includes a central processing unit (CPU), a memory, and a CAN communication unit. Also, the telematics unit may include a plurality of communication modules capable of transmitting and receiving data, for providing a service using wireless communication.

The telematics unit may include one or more the communication modules, and for example, may include a WCMDA communication module, a WiBro communication module, a Wi-Fi communication module, etc.

The telematics unit provides an emergency relief service such as the automatic notification of an accident, a service that collects vehicle information and is operationally connected to a center, a telephone service, a secretary service, and a multimedia service such as web browsing, by using the built-in communication modules. When three types of communication modules operate to be suitable for respective functions thereof, the telematics unit is designed to support a telematics service function and a multimedia service function in operational connection with a wireless network inside and a mobile communication network outside a vehicle.

The WCDMA communication module and the WiBro communication module are operated in the active/stand-by mode that have been defined depending on available areas, and thus, do not simultaneously transmit/receive data. However, the Wi-Fi communication module provides a communication service by transmitting/receiving data irrespective of the data transmission/reception states of the other two communication modules.

However, since three types of communication modules are included in one unit and transmit/receive data, frequency interference between the communication modules occurs in wireless transmission/reception. In this case, a design using a frequency band-related filter may be made for minimizing interference between frequency bands in hardware, but it is very difficult to fundamentally prevent the occurrence of frequency interference.

Especially, there are many cases in which the WiBro communication module using a frequency band of 2.3 GHz and the Wi-Fi communication module using a frequency band of 2.4 GHz transmit/receive data at the same time, but since the two communication modules use a nearby frequency band, interference occurs between frequencies, causing the reduction in a wireless communication speed.

SUMMARY

Accordingly, the present disclosure provides a communication system in which a communication port is connected between two communication modules, and thus the data transmission/reception of one communication module is adjusted depending on the data transmission/reception state of the other communication module, thereby preventing a data transmission/reception speed from being reduced due to frequency interference.

In one general aspect, a telematics communication system includes: a plurality of communication modules transmitting and receiving data over different frequency bands; and a communication port connecting the communication modules, the communication port being controlled depending on a data transmission and reception state of a first communication module of the connected communication modules, and the communication port supplying information on the data transmission and reception state of the first communication module to a second communication module of the communication modules, wherein the second communication module checks the data transmission and reception state of the first communication module through the communication port, and when the first communication module is transmitting and receiving data, the second communication module does not transmit data.

When the first communication module is receiving data, the second communication module may not transmit data, and when the first communication module does not receive data, the second communication module may transmit data.

When the first communication module is receiving data, the communication port may maintain a high state, and when the first communication module does not receive data, the communication port may maintain a low state.

When the communication port maintains the high state, the second communication module may not transmit data, and when the communication port maintains the low state, the second communication module may transmit data.

The first communication module may be a WiBro communication module, and the second communication module may be a Wi-Fi communication module.

The first communication module may be a Wi-Fi communication module, and the second communication module may be a WiBro communication module.

The communication port may be a GPIO communication port.

In another general aspect, a telematics communication method includes: checking whether a first communication module transmits and receives data; setting a communication port connected to the first communication module to a high state when the first communication module is receiving data and, when the first communication module does not receive data, setting the communication port to a low state; checking, by a second communication module, a state of the communication port; and transmitting data depending on the state of the communication port, wherein the second communication module connected to the communication port does not transmit data when the communication port is in the high state and, when the communication port is in the low state, the second communication module transmits data.

Other features and aspects will be apparent from the following detailed description, the drawings, and the claims.

BRIEF DESCRIPTION OF THE DRAWINGS

FIG. 1 is a diagram illustrating a telematics unit and apparatuses operationally connected to the telematics unit.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

Figure 2A:
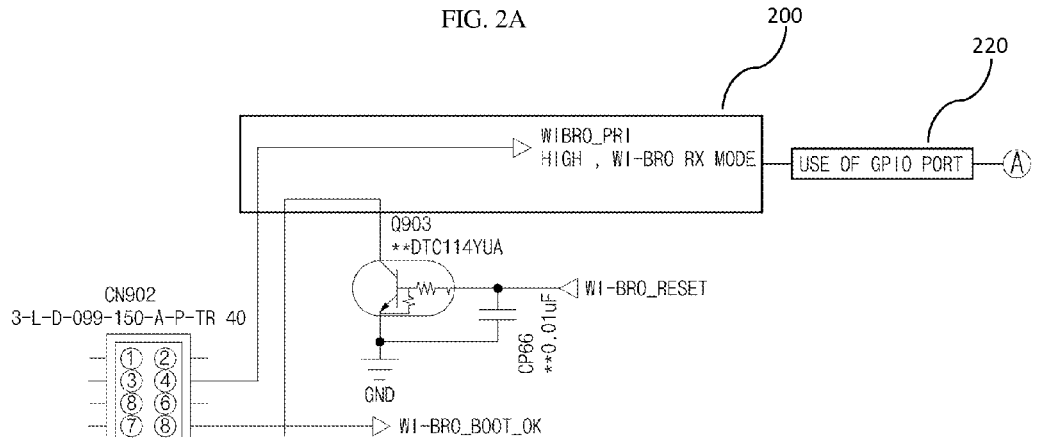
FIGS. 2A and 2B are diagrams illustrating a telematics communication system according to an embodiment of the present invention.
Figure 2B:
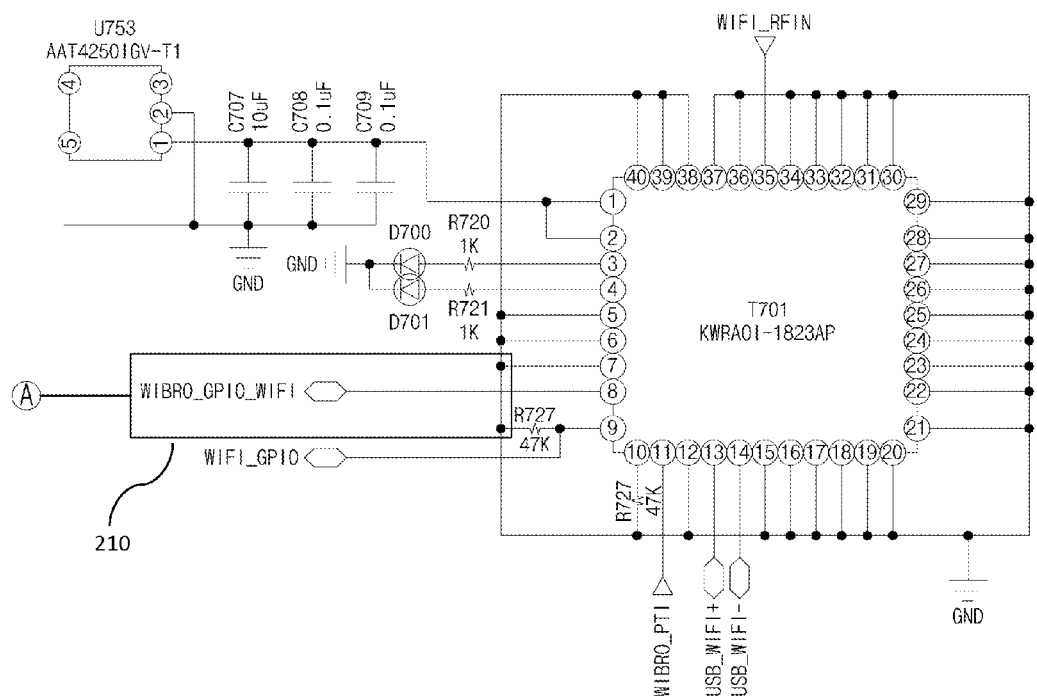

FIGS. 2A and 2B illustrate a telematics communication system according to an embodiment of the present invention.

The telematics communication system may include a plurality of communication modules, and for example, may include a WCDMA communication module, a WiBro communication module, and a Wi-Fi communication module. The WCDMA communication module and the WiBro communication module are operated in the active/stand-by mode that have been defined depending on available areas, and thus, frequency interference does not occur between the WCDMA communication module and the WiBro communication module.

The Wi-Fi communication module may transmit/receive data simultaneously with the WCDMA communication module or the WiBro communication module. In this case, interference does not occur between the Wi-Fi communication module and the WCDMA communication module, but since the WiBro communication module using a frequency band of 2.3 GHz and the Wi-Fi communication module using a frequency band of 2.4 GHz use a nearby frequency band, frequency interference occurs between the WiBro communication module and the Wi-Fi communication module when simultaneously transmitting/receiving data.

As illustrated in FIGS. 2A and 2B, in the present invention, a GPIO communication port 220 is connected between the Wi-Fi communication module 210 and a dual modem with the WCDMA communication module and WiBro communication module 200 mounted thereon, thereby preventing frequency interference.

By installing the WiBro communication module 200 as a control master communication module, when the WiBro communication module 200 is receiving data from an external network, the GPIO communication port 220 is maintained in a high state. The Wi-Fi communication module 210 does not transmit data when the GPIO communication port 220 is maintaining a high state, and thus prevents a speed from being reduced due to frequency interference.

When the WiBro communication module 200 is transmitting data or does not transmit/receive data, the GPIO communication port 220 is maintained in a low state. The Wi-Fi communication module 210 transmits data only when the GPIO communication port 220 is maintaining a low state.

The reason that fundamentally installs the WiBro communication module 200 as the control master is for ensuring a WiBro transmission speed because a speed with an external network outside the WiBro communication module 200 becomes a main issue, and is because the Wi-Fi communication module 210 has a speed relatively faster than the WiBro communication module 200, and thus, the reduction in a speed hardly affects service quality.

Figure 3:
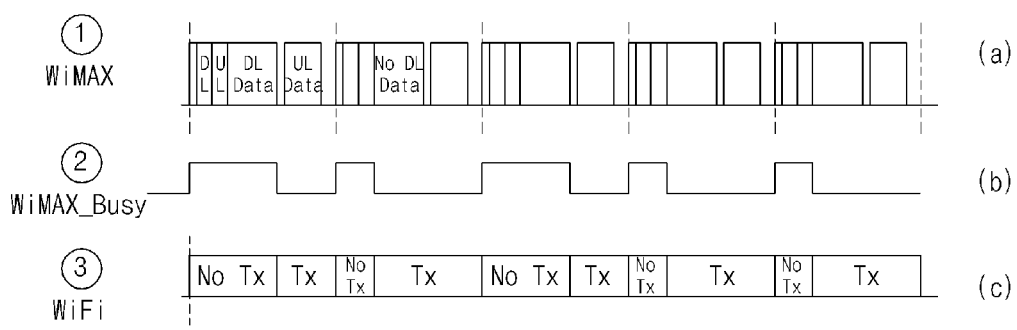
FIG. 3 is diagrams showing a state in which a WiBro communication module of the telematics communication system according to an embodiment of the present invention transmits/receives data, an operating state of a GPIO communication port, and a state in which a Wi-Fi communication module transmits/receives data.

FIG. 3 is diagrams showing a state in which the WiBro communication module of the telematics communication system according to an embodiment of the present invention transmits/receives data, an operating state of the GPIO communication port connecting the WiBro communication module and the Wi-Fi communication module, and a state in which the Wi-Fi communication module transmits/receives data.

A portion (a) of FIG. 3 shows a state in which the WiBro communication module 200 transmits/receives data. Here, the state of the WiBro communication module 200 may be divided into a state that receives data, a state that transmits data, and a state that does not transmit/receive data.

A portion (b) of FIG. 3 shows a state in which the GPIO communication port 220 operates depending on the transmission/reception state of the WiBro communication module 200.

The GPIO communication port 220 maintains a high state when the WiBro communication module 200 is receiving data, but when the WiBro communication module 200 is transmitting data or does not transmit/receive data, the GPIO communication port 220 maintains a low state.

A portion (c) of FIG. 3 shows a state in which the Wi-Fi communication module 210 transmits/receives data on the basis of the data transmission/reception state of the WiBro communication module 200.

The transmission/reception state of the WiBro communication module 200 may be known by checking the state of the GPIO communication port 220. Therefore, when the GPIO communication port 220 is maintained in a high state, the Wi-Fi communication module 210 does not transmit data because the WiBro communication module 200 receives data. On the other hand, when the GPIO communication port 220 is maintained in a low state, the Wi-Fi communication module 210 transmits data because the WiBro communication module 200 does not receive data.

Accordingly, the present invention disallows the Wi-Fi communication module 210 to transmit data when the WiBro communication module 200 is receiving data, and thus prevents frequency interference and prevents the reduction in a data transmission/reception speed.

Figure 4:
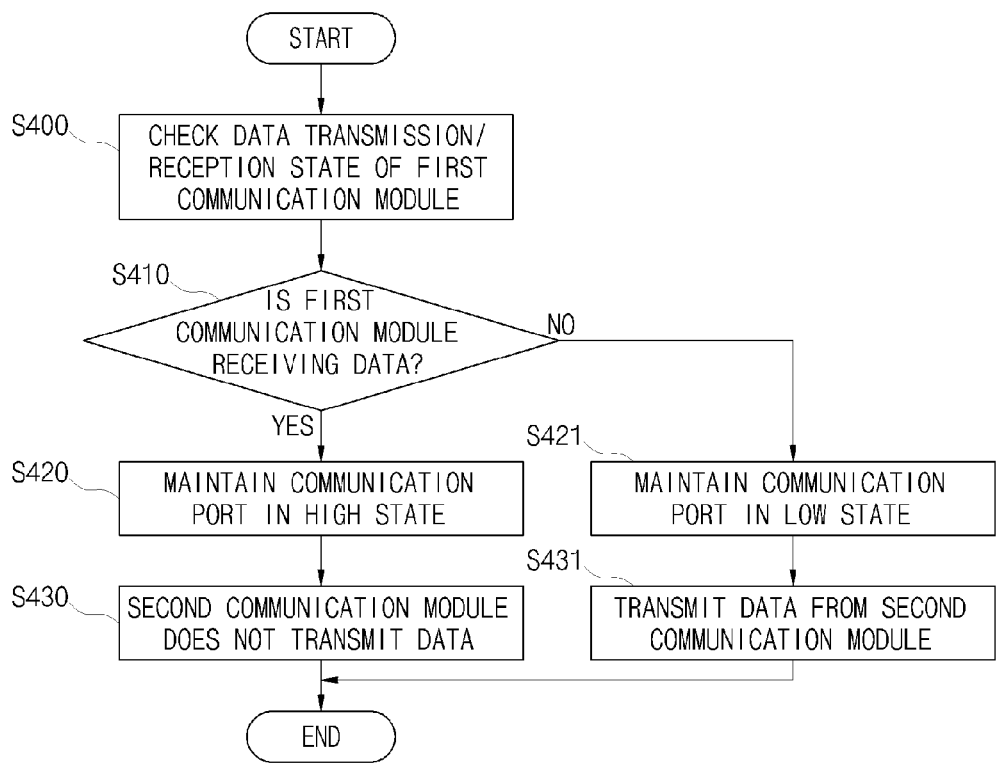
FIG. 4 is a flowchart illustrating a telematics communication method according to an embodiment of the present invention.

FIG. 4 illustrates a flowchart of a telematics communication method according to an embodiment of the present invention.

When a plurality of communication modules included in the same system transmit/receive data at the same time, a data transmission/reception speed is reduced due to frequency interference. For this reason, it is required to control the data transmission/reception of each of the communication modules.

Accordingly, when two communication modules are included in the same system, a communication port connecting the two communication modules may control the transmission/reception of data. In this case, one of the two modules that is much affected by interference is installed as a control master module.

When the control master module is a first communication module, the telematics communication system checks the data transmission/reception state of the first communication module, in operation S400. It is required to control the transmission state of a second communication module depending on the data transmission state of the first communication module, and thus, the telematics communication system checks the transmission state of the first communication module.

The telematics communication system checks whether the first communication module is receiving data in operation S410, and when the first communication module is receiving the data, the telematics communication system maintains the state of a communication port (which connects the first and second communication modules) as a high state, in operation S420. When it is checked that the first communication module does not receive data, the telematics communication system maintains the state of the communication port as a low state, in operation S421.

The second communication module may check the data transmission/reception state of the first communication module through the communication port connected to the first communication module.

When the communication port is maintained in a high state, the second communication module does not transmit data, for preventing the data reception speed of the first communication module from being reduced due to frequency interference, in operation S430. When the communication port is maintained in a low state, even though the second communication module transmits data, the data transmission speed of the first communication module is not much reduced, and thus, the second communication module transmits data, in operation S431.

According to an experiment result, when a communication system is operated using the plurality of communication modules that are connected by the GPIO communication port according to an embodiment of the present invention, a data reception speed is not reduced due to frequency interference in a case where the WiBro communication module receives data, and the transmission speed of the WiBro communication module is maintained similarly to that of the Wi-Fi communication module.

As described above, in a telematics service, since it is required to ensure the transmission quality of WiBro and Wi-Fi has a relatively fast communication speed, the first communication module may be the WiBro communication module, and the second communication module may be the Wi-Fi communication module. Alternatively, the first communication module may be the Wi-Fi communication module, and the second communication module may be the WiBro communication module. However, all the two cases can prevent frequency interference.

As described above, the communication port is connected between the WiBro communication module and the Wi-Fi communication module, and thus, when the WiBro communication module is receiving data, the present invention disallows the Wi-Fi communication module to transmit data, thereby preventing a data transmission/reception speed from being reduced due to frequency interference that occurs when the two communication modules operate simultaneously.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A telematics communication system, comprising:
   a plurality of communication modules transmitting and receiving data over different frequency bands; and
   a communication port connecting the communication modules, the communication port being controlled to a high state or a low state depending on a data transmission and reception state of a first communication module of the connected communication modules, and the communication port supplying information on the data transmission and reception state of the first communication module to a second communication module of the communication modules,
   wherein the second communication module checks the data transmission and reception state of the first communication module through the communication port, and when the first communication module is transmitting and receiving data, the second communication module does not transmit data.

2. The telematics communication system of claim 1, wherein,
   when the first communication module is receiving data, the second communication module does not transmit data, and
   when the first communication module does not receive data, the second communication module transmits data.

3. The telematics communication system of claim 1, wherein,
   when the first communication module is receiving data, the communication port maintains a high state, and
   when the first communication module does not receive data, the communication port maintains a low state.

4. The telematics communication system of claim 3, wherein,
   when the communication port maintains the high state, the second communication module does not transmit data, and
   when the communication port maintains the low state, the second communication module transmits data.

5. The telematics communication system of claim 4, wherein the first communication module is a WiBro communication module, and the second communication module is a Wi-Fi communication module.

6. The telematics communication system of claim 4, wherein the first communication module is a Wi-Fi communication module, and the second communication module is a WiBro communication module.

7. The telematics communication system of claim 1, wherein the communication port is a GPIO communication port.

8. A telematics communication method, comprising:
checking whether a first communication module transmits and receives data;
setting a communication port connected to the first communication module to a high state when the first communication module is receiving data and, when the first communication module does not receive data, setting the communication port to a low state;
checking, by a second communication module, a state of the communication port; and
transmitting data depending on the state of the communication port, wherein the second communication module connected to the communication port does not transmit data when the communication port is in the high state and, when the communication port is in the low state, the second communication module transmits data.

9. The telematics communication method of claim 8, wherein the first communication module is a WiBro communication module, and the second communication module is a Wi-Fi communication module.

10. The telematics communication method of claim 8, wherein the first communication module is a Wi-Fi communication module, and the second communication module is a WiBro communication module.

11. The telematics communication method of claim 8, wherein the second communication module has a speed relatively faster than the first communication module.

12. The telematics communication system of claim 1, wherein the second communication module has a speed relatively faster than the first communication module.

* * * * *